Aug. 11, 1942.  C. A. BUICK  2,292,429
CLASP
Filed Sept. 20, 1940  2 Sheets-Sheet 1
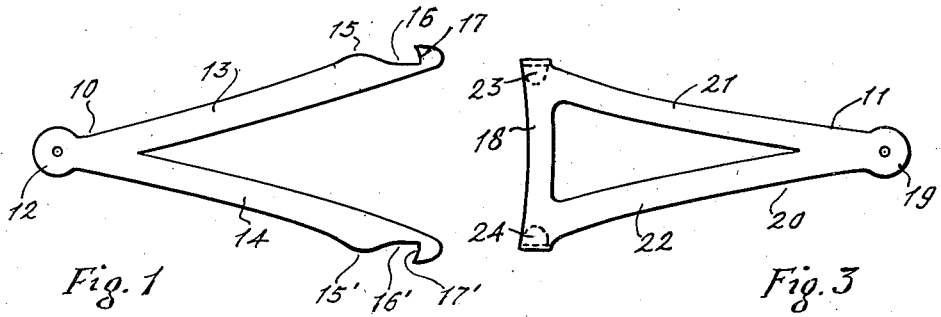
Fig. 1  Fig. 3
Fig. 2  Fig. 4
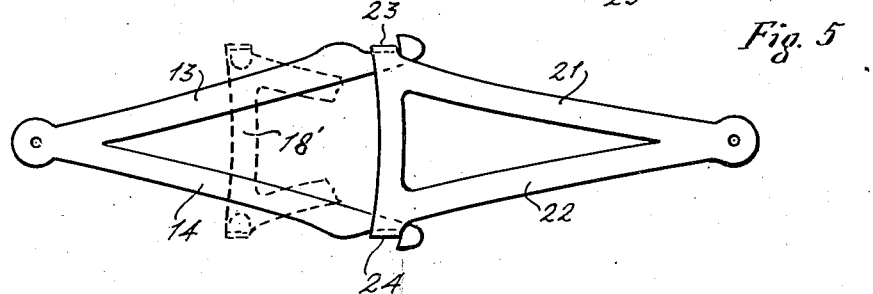
Fig. 5
Fig. 6
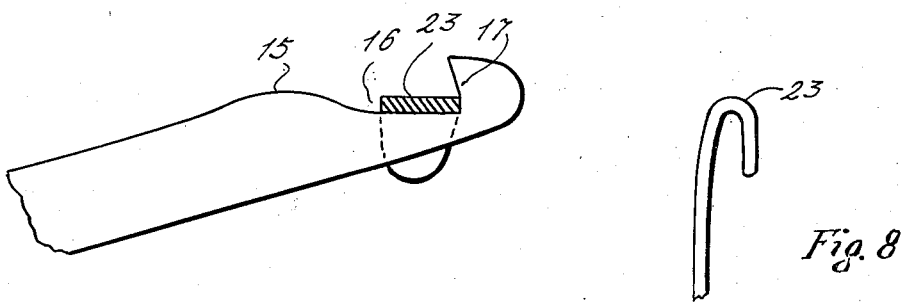
Fig. 7  Fig. 8
INVENTOR
Charles A. Buick
BY
Guido M. Sacerdote
ATTORNEY Aug. 11, 1942.   C. A. BUICK   2,292,429
CLASP
Filed Sept. 20, 1940   2 Sheets-Sheet 2

INVENTOR
Charles A. Buick
BY
Guido M. Sacerdote
ATTORNEY

Patented Aug. 11, 1942

2,292,429

UNITED STATES PATENT OFFICE 2,292,429

CLASP

Charles A. Buick, Rockville Centre, N. Y.

Application September 20, 1940, Serial No. 357,628

4 Claims. (Cl. 24—201)

This invention relates to fastening devices and more particularly refers to improvements in clasps of the kind whereby the ends of a necklace, belt, or the like, may be detachably fastened together.

Jewelry clasps of the type currently in use usually comprise a female member having a slot and a spring-acting male member adapted to be inserted within said slot and forced in the direction of the female member until the spring catch of the male member snaps into engaging position.

In order to separate the two members it becomes then necessary to first press the spring portion of the male member so as to release it from the engaging position and then to withdraw the male member from the female member by outward movement with respect thereto.

The connection so effected between the two members thus depends entirely upon the action of a compressible spring and since after release of the spring the two members can be separated by moving them away from each other, if the spring catch is not absolutely positive in its action there is always the danger that the pulling action exerted on the two members may overcome the action of the spring catch and cause the two members to become disconnected. In practice, the two members of which a clasp is composed, forming as they do the terminals for the ends of a chain or necklace, or similar article, which are to be detachably fastened together, are almost constantly subjected to a pulling action, so that their accidental separation and loss of the article is a frequent occurrence.

For the sake of protection against this possibility, clasps employed in connection with very valuable jewelry are generally provided with additional locking means which, however, greatly complicate their construction and the manipulation necessary for their use.

In this connection it is well to bear in mind that clasps used for jewelry purposes are necessarily very small and unobtrusive, so that their construction is very exacting and expensive and their manipulation is not as quick and easy as would be desirable.

The main object of the present invention is to provide a clasp of extremely simple construction, comprising two members adapted to be connected to or disconnected from each other solely by longitudinal displacement thereof in opposite directions to or from their interengaging position, without the necessity of first forcing one member out of engagement with the other by a separate operation.

Another object is to provide a clasp of a simple and novel construction, in which the two members of which the clasp is composed are set in their interengaging position by relative outward longitudinal movement, thus providing an interlocking engagement positively preventing the two members from coming apart when subjected to a pulling action.

A further object is to provide a clasp of a novel and improved construction which, although comprising a spring-acting member adapted to snap into engagement with another member which is relatively rigid, does not depend solely upon the locking action due to the snapping of the spring-acting member into engaging position for preventing the two members from becoming accidentally separated under the stress of a pulling action tending to move them apart.

Other objects and advantages of the present invention will more fully appear as the description proceeds and will be set forth and claimed in the appended claims.

My invention is illustrated by way of example in the accompanying drawings, in which:

Fig. 1 is a plan view of the male member of a clasp representing the preferred embodiment of my invention;

Fig. 2 is a side view in elevation thereof;

Fig. 3 is a plan view of the female member;

Fig. 4 is a side view in elevation thereof;

Fig. 5 is an end view of the female member from the left of Fig. 3;

Fig. 6 is a plan view of a clasp in its assembled condition;

Fig. 7 is a fragmentary plan view in an enlarged scale, partly sectioned, illustrating the preferred outline of one of the notches provided in the male member;

Fig. 8 is a fragmentary end view of the hook portion of the female member shown in Fig. 7;

Figure 9:
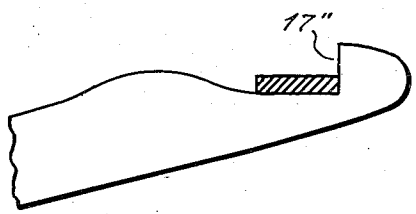
Fig. 9 is a view similar to Fig. 7, illustrating a notch having an alternative outline.

The clasp forming the subject of the present invention essentially comprises two members adapted to be detachably connected to each other, one of said two members having two diverging slightly resilient legs forming a bifurcated structure, and the other member being adapted to be superimposed on said first mentioned member in a position where their ends overlap and to snap into engagement with said two legs when from said position the two members are moved away from each other in a longitudinal direction to a position where an end abutment provides a stop preventing the two members from being moved further apart.

The clasp of Figs. 1 to 8 comprises a male member 10 and a female member 11. The male member consists of an attaching end 12, adapted to be secured to the end of a chain or belt, and two diverging legs 13 and 14, extending V-shaped from said attaching end, said two legs possessing a certain amount of resiliency in their common plane.

In proximity of its outer end each leg is formed with a slight bulge 15, having a rounded outline, constituting the leading edge of a notch 16, the opposite end edge 17 of which forms a sharp stop directed at an angle of not more than 90° to the central line of the V-structure described.

As Fig. 7 clearly shows, the resulting outline of each leg of the male member is comparable to that of the end of a crochet needle. The rounded outline of the bulge provides a cam-acting edge operative in both directions when a bridge member having inwardly bent ends, spaced a distance substantially corresponding to that separating the bottoms of notches 16, 16' from each other, is forced in a longitudinal direction to or from said notches.

It will be understood that said cam action will result in forcing the two legs toward each other when the bent ends of the bridge member ride over said bulges 15, 15', the resiliency of the two legs causing them to instantly resume their normal position as soon as the bridge member has passed beyond said bulges in one or the other direction.

The bridge member referred to is constituted by the outer end 18 of the female member, which female member also comprises an attaching end 19 and a body portion 20, terminating in bridge member 18. Said body portion 20 is preferably also in the form of a V-shaped structure, comprising two diverging bar portions 21, 22, leading to the ends of bridge member 18, resulting in the female member having an outline substantially matching the outline of the male member.

The bridge member 18 extends transversely of the central line of the V-structure and has its ends bent inwardly to form hook portions 23, 24, as shown in Fig. 5, the distance between the bottom surfaces of said hook portions substantially corresponding to the distance between the bottom edges of notches 16, 16'.

Owing to the fact that the male member decreases in width from its outer end towards its attaching end, it is possible to place the female member in superimposed abutment with respect thereto, with the hook portions of said female member projecting beyond the plane of the male member when the bridge member 18 of the female member is moved to a position such as shown in dotted lines at 18' in Fig. 6, where its hook portions clear the legs 13, 14 of the male member. It is then possible to move the two members away from each other in a longitudinal direction while maintaining the contact therebetween, so that when the hook portions reach and ride over the bulges 15, 15', the two legs 13, 14 will be forced inwardly, and as soon as the two leg portions reach a position directly opposite the notches 16, 16' the two legs will be free to snap into engagement therewith.

In this position, as Figs. 6 and 7 clearly show, the bent edge of each hook portion abuts directly against the end edge 17, 17' of the corresponding notch, so that said edges 17, 17' together form a positive stop preventing the two members from becoming separated under the action of an outward pull.

On the other hand, owing to the fact that the bulges 15, 15' have a curved outline sloping at an easy angle in both directions, when from their connected position shown in Fig. 6 the two members are forced inwardly with respect to each other, the two legs of the male member will once more yield to permit the female member being returned to the position shown in dotted lines in Fig. 6, where the two members can be separated by bodily relative movement at right angles to their common plane.

It is thus obvious that the construction advocated results in an effective device for fastening the two ends of a chain or belt to each other whereby the two members composing the device are positively prevented from accidentally coming apart when a pull is exerted upon said members in opposite directions. It will also be observed that the device is extremely simple and does not require the manipulation of small catches or springs which frequently make the operation of jewelry catches difficult and often result in breaking the fingernails or jagging their edges.

In the construction illustrated in Figs. 1 to 8, in order to provide a more effective locking action the end edge of the notches is shown directed at an angle of less than 90°. An effective locking action will also be had if said end edge is directed at a 90° angle, as shown at 17'' in Fig. 9, or even if the angle is slightly more than 90° so long as the resulting edge is sufficiently steep to prevent its yielding by cam action when the two members are subjected to an outward pull in opposite directions.

Figure 10:
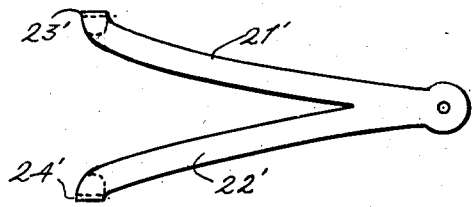
Fig. 10 is a plan view of an alternative form of female member.
Figure 11:
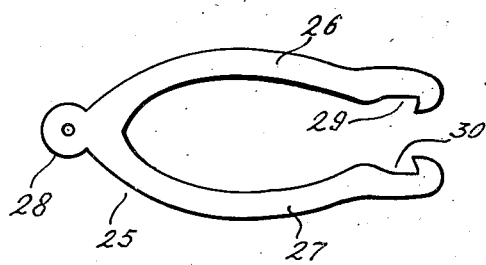
Fig. 11 is a plan view of the male member of a clasp embodying my invention in an alternative form.
Figure 12:
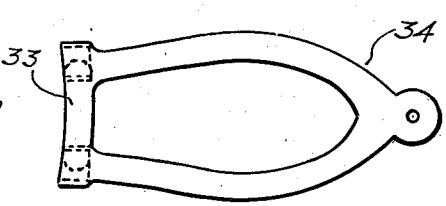
Fig. 12 is a plan view of the female member.
Figure 13:
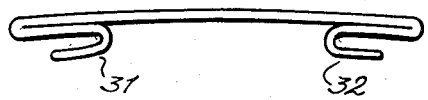
Fig. 13 is an end view in an enlarged scale of the female member from the left of Fig. 12.

If desired, the rigid bridge member 18, forming part of the female member may be omitted and the female member may be formed like the male member with two diverging legs 21', 22', as shown in Fig. 10, said two legs having their outer end bent to form two inwardly directed hook portions 23', 24'.

In this case, both members will be slightly resilient and when connected to each other, the resultant deformation caused by the bulging leading edges 15, 15' of the notches will be shared by both members.

In order to carry my invention into practice, it is not absolutely necessary that the notches be provided in the resilient member or that they be located along the outer edges of the male member since obviously their position can be reversed. For instance, in Figs. 11 to 14 I show a construction in which the male member 25 comprises two diverging legs 26, 27, extending from the attaching end 28, said two legs having an outwardly curved outline and having their outer ends provided with notches 29, 30, along their inner edge, said notches substantially corresponding in both outline and action to notches 16, 16' and being adapted to be engaged by the outwardly directed hook portions 31, 32 reversely bent from the end of the bridge portion 33 of the female member 34.

Figure 14:
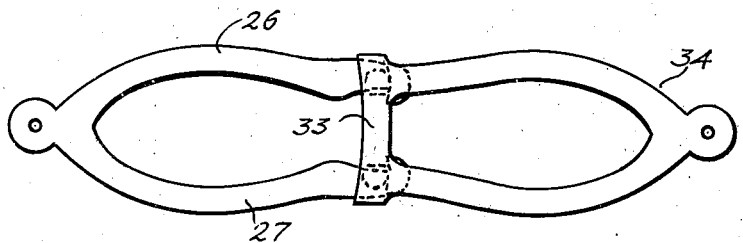
Fig. 14 is a plan view of the clasp assembled.

As will be understood, the two members 25, 34 can be connected by first superimposing the latter on the former in a position where the hook portions 31, 32 will clear the inner edges of the bulging portions of legs 26, 27 of the male member. The two members can then be longitudinally moved in opposite directions until the hook portions 31, 32 engage the notches 29, 30 and will be prevented from further movement by the end edges of said notches. The bulging leading edges of the notches will in this case force the two legs of the male member outwardly instead of inwardly when the hook portions of the female member ride over said bulging leading edges, and the resiliency of the said two legs will cause them to snap into engagement with the female member as soon as the hook portions thereof have reached a position directly opposite the notches, as shown in Fig. 14.

The two members composing the device can be made of wire, if desired, but in practice I prefer to use flat stock, making it possible to produce it entirely by blanking and stamping operations and providing a greater range for the production of a variety of ornamental designs.

Various changes may be made in the construction of my device without departing from the inventive idea. The drawings should, therefore, be understood as being intended for illustrative purposes only and not in a limiting sense.

I, accordingly, reserve the right to carry my invention into practice in all those ways and manners which may enter, fairly, into the scope of the appended claims.

I claim:

1. A device of the class described comprising a male member and a female member adapted to be detachably connected to each other, one of said members at least having an attaching end and a body portion including two diverging legs longitudinally extending from said end to form a bifurcated structure slightly resilient in the plane of said legs, the other member having an attaching end and a body portion longitudinally extending therefrom, the male member having two transversely spaced marginal notches in proximity of its outer end, the female member having two transversely spaced, transversely directed extensions reversely bent to form hook portions adapted to register with and engage said notches, the notched edges of said male member, at a point longitudinally spaced from its outer end, being transversely spaced from each other a distance clearing the hook portions of the female member, thereby making it possible for said hook portions to clear and project beyond the plane of the male member when said two members are placed in non-interlocking overlapping relation and are then bodily moved one towards the other while maintaining unchanged their longitudinal position with relation to each other, to a position in which the open part of the hook portions is on a common plane with the said notched edges, said hook portions being adapted to engage said notches when said two members are subsequently moved away from each other in a longitudinal direction while the coplanar relation between said hook portions and notched edges is maintained, the leading end of the edge of each notch having a curved outline adapted to coact by cam action with its engaging hook portion to force its leg in the disengaging direction when said two members are longitudinally displaced with respect to each other to or from their interlocking position.

2. A device of the class described comprising a male member and a female member adapted to be detachably connected to each other, one of said members at least having an attaching end and a body portion including two diverging legs longitudinally extending from said end to form a bifurcated structure slightly resilient in the plane of said legs, the other member having an attaching end and a body portion longitudinally extending therefrom, the male member having two transversely spaced marginal notches in proximity of its outer end, the female member having two transversely spaced, transversely directed extensions reversely bent to form hook portions adapted to register with and engage said notches, the notched edges of said male member, at a point longitudinally spaced from its outer end, being transversely spaced from each other a distance clearing the hook portions of the female member, thereby making it possible for said hook portions to clear and project beyond the plane of the male member when said two members are placed in non-interlocking overlapping relation and are then bodily moved one towards the other while maintaining unchanged their longitudinal position with relation to each other, to a position in which the open part of the hook portions is on a common plane with the said notched edges, said hook portions being adapted to engage said notches when said two members are subsequently moved away from each other in a longitudinal direction while the coplanar relation between said hook portions and notched edges is maintained, the leading end of the edge of each notch having a curved outline adapted to coact by cam action with its engaging hook portion to force its leg in the disengaging direction when said two members are longitudinally displaced with respect to each other to or from their interlocking position, and the outer end of the edge of each notch being laterally directed to provide a positive abutment preventing said two members from coming apart when subjected to and outward longitudinal pull.

3. A device of the character described comprising a male and a female member adapted to be detachably connected to each other, said male member having an attaching end and two diverging legs extending therefrom to form a V-shaped structure slightly resilient in the plane of said legs, the outer edge of each of said legs being provided with a notch in proximity of its outer end, the leading end of the edge of said notch having a curved outline, and the outer end of said edge being laterally directed at an angle of the order of ninety degrees, the female member having its outer end formed with two transversely spaced, transversely directed extensions reversely bent to form hook portions adapted to register with and engage said notches, said hook portions clearing and projecting beyond the plane of the male member when said two members are placed in non-interlocking overlapping relation and are then bodily moved one towards the other while maintaining unchanged their longitudinal position with relation to each other, to a position in which the open part of the hook portions is on a common plane with the said notched edges, said hook portions being adapted to engage said notches when said two members are subsequently moved away from each other in a longitudinal direction while the coplanar relation between said hook portions and notched edges is maintained.

4. A device of the character described, comprising a male and a female member adapted to be detachably connected to each other, said male member having an attaching end and two diverging legs extending therefrom to form a V-shaped structure slightly resilient in the plane of said legs, the outer edge of each of said legs being provided with a notch in proximity of its outer end, the leading end of the edge of said notch having a curved outline, and the outer end of said edge being laterally directed at an angle of the order of ninety degrees, the female member having an outline substantially symmetrical with that of the male member, and having its outer end formed with two transversely spaced, transversely directed extensions reversely bent to form hook portions adapted to register with and engage said notches, said hook portions clearing and projecting beyond the plane of the male member when said two members are placed in non-interlocking overlapping relation and are then bodily moved one towards the other while maintaining unchanged their longitudinal position with relation to each other, to a position in which the open part of the hook portions is on a common plane with the said notched edges, said hook portions being adapted to engage said notches when said two members are subsequently moved away from each other in a longitudinal direction while the coplanar relation between said hook portions and notched edges is maintained.

CHARLES A. BUICK.